United States Patent [19]
Barnes et al.

[11] Patent Number: 6,072,580
[45] Date of Patent: Jun. 6, 2000

[54] METHOD FOR ANODICALLY BONDING AN ELECTRODE TO A RING LASER GYRO BLOCK

[75] Inventors: David A. Barnes, Palm Harbor; Paul O. Rock, St. Petersburg, both of Fla.; Timothy A. Beckwith, Coon Rapids, Minn.; Curtis W. Anderson, Largo, Fla.

[73] Assignee: Honeywell Inc., Morristown, N.J.

[21] Appl. No.: 09/235,000

[22] Filed: Jan. 21, 1999

[51] Int. Cl.$^7$ .................................................. G01C 19/66
[52] U.S. Cl. .............................................. 356/350; 372/94
[58] Field of Search ............................ 356/350; 372/94; 228/116

[56] References Cited

U.S. PATENT DOCUMENTS

| | | | |
|---|---|---|---|
| 4,612,647 | 9/1986 | Norvell | 356/350 |
| 4,995,893 | 2/1991 | Jenkins et al. . | |
| 5,052,012 | 9/1991 | Norvell | 372/94 |
| 5,098,189 | 3/1992 | vonBieren . | |
| 5,197,653 | 3/1993 | Beckwith et al. | 228/116 |
| 5,432,604 | 7/1995 | Canfield et al. . | |
| 5,578,103 | 11/1996 | Araujo et al. . | |

OTHER PUBLICATIONS

"Hermetic Glass Sealing By Electrostatic Bonding" in the Journal of Non–Crystalline Solids 38 and 39 (1980) by Peter R. Younger of Spire Corporation, Patriots Park, Bedford, MA 01730, pp. 909–913.

"Field Assisted Glass Sealing" in the Electrocomponent Science and Technology (1975), vol. 2 by George Wallis of P.R Mallory & Co. Inc., Laboratory for Physical Science, Burlington, MA 01803, pp. 25–53.

"Field Assisted Glass–Metal Sealing" in the Journal of Applied Physics, Vol. 40, No. 10, Sep. 1969 by George Wallis and Daniel Pomermantz of P.R. Mallory & Co. Inc., Burlington, MA 01803, pp. 3946–3949.

"Mechanisms Of Anodic Bonding Of Silicon To Pyrex® Glass" by Kevin B. Albaugh, Paul E. Cada of IBM General Technology Division, Essex Junction, VT 05452 and Don H. Rasmussen of Department of Chemical Engineering, Clarkson University, Potsdam, NY 13676, pp. 109–110.

*Primary Examiner*—Samuel A. Turner
*Attorney, Agent, or Firm*—Albert K. Kau

[57] ABSTRACT

A method for forming an electrode seal between an excitation electrode and a laser block in a ring laser gyro having increased bond durability, strength, and greater resistance to solvents and reactive compounds. A thin ring of sealing material is positioned between an excitation electrode and a laser block of the ring laser gyro, and the sealing material is compressed. Chemical and physical bonds are formed between the excitation electrode and the sealing material and between the sealing material and the laser block. A predetermined electrical potential is applied across the excitation electrode, the sealing material, and the laser block for a pre-determined period of time and at a pre-determined temperature. The electrical potential increases the number of chemical and physical bonds that are formed at the seal, thus increasing the bond durability and strength.

13 Claims, 2 Drawing Sheets

METHOD FOR ANODICALLY BONDING AN ELECTRODE TO A RING LASER GYRO BLOCK

TECHNICAL FIELD

The present invention is related to a ring laser gyro. More specifically, the invention is a method for bonding the excitation electrodes to the laser block of the ring laser gyro.

BACKGROUND OF THE INVENTION

Ring laser angular rate sensors, commonly referred to as ring laser gyros, are well known and in widespread use today. For example, ring laser gyros are frequently used in guidance and navigation modules on a variety of vehicles, including airplanes, unmanned rockets, and military tanks. In addition, ring laser gyros are used in down-hole drilling operations, such as for oil, for providing precise locations of a drilling bit.

A typical ring laser gyro includes a laser block having a plurality of interconnected passages formed within the block. The passages are arranged in a closed loop polygon shape, such as a triangle or a rectangle, and reflective surfaces are positioned at the intersection of each passage with another passage. In this manner, an optical closed loop path is created within the laser block. A lasing gas, such as helium-neon for example, is contained within the closed loop path.

A pair of electrodes are mounted to the laser block in fluid communication with lasing gas in the closed loop path. One electrode serves as a cathode, and the other electrode serves as an anode. An electrical potential is created across the cathode and anode through the lasing gas. This electrical potential creates a population inversion in the lasing gas, which in turn generates a laser that traverses the optical closed loop path of the laser block. The ring laser gyro can include a third electrode that serves as a second anode. An electrical potential created across the cathode and the second anode creates a counter-rotating laser traversing the optical closed loop path.

An important feature of a ring laser gyro is the seal between the electrodes and the laser block. The electrodes must be sealed to the block in a gas-tight manner to prevent escape of the lasing gas from within the gyro, to prevent the intrusion of ambient gases into the gyro, and to provide mechanical support for the electrode itself. Conventionally, an indium seal is used to mount the electrodes to the laser block. A thin ring of ductile indium is compressed between the electrode and the laser block. Chemical and physical bonds are formed between the indium and the ring laser gyro components (i.e. the laser block and the electrode) during this compression operation.

Electrode seals, however, are subject to delamination when exposed to thermal and mechanical stresses as well as certain reactive solvents and compounds. Such exposure is common during both the manufacture and operation of the gyro. Thermal and mechanical stresses result from design, testing, handling and end use environments. Exposure to reactive solvents and compounds occurs as part of the manufacturing process, end use environment, and gyro operation. Reactive compounds can also be introduced as a result of material selection. An example of the latter stems from the common use of lithium-aluminum-silicate glass ceramic in the design of ring laser gyros. A number of properties of this glass ceramic make it highly desirable as laser block material, however, the material contains reactive alkali metals, such as lithium, which is known to hasten seal degradation, given appropriate seal surface conditions and concomitant contaminants.

The desired extension of gyro usage to applications having ever greater service life requirements, with increasingly severe environmental exposures, creates the need for an electrode seal more durable than those achievable using the current art. Such an improved electrode seal should provide increased durability in the presence of thermal and mechanical stresses, certain reactive solvents and compounds.

SUMMARY OF THE INVENTION

The present invention is a method for forming an electrode seal between an electrode and a laser block of a ring laser angular rate sensor. The method creates a seal that has an increased bond strength as compared to conventional electrode seals, and that is resistant to certain reactive solvents and compounds.

The method for forming an electrode seal includes the steps of providing a laser block having an optical closed loop path formed within the laser block, mounting an excitation electrode to the laser block in fluid communication with the optical closed loop path, and applying a predetermined electrical potential of the correct polarity and voltage across the excitation electrode and the laser block for a predetermined period of time at a predetermined temperature. The excitation electrode can be mounted to the laser block by compressing a ductile metallic sealing material between the excitation electrode and the laser block to form physical and chemical bonds between the laser block and the sealing material and between the electrode and the sealing material. In a preferred embodiment, the sealing material that is used is indium.

The electrical potential is applied across the electrode and the laser block through a return electrode. The return electrode is placed in contact with a surface of the laser block in proximity to the excitation electrode. The return electrode and the excitation electrode are attached to terminals of a source of electrical potential, and the predetermined voltage is thus placed across the excitation electrode and the laser block such that the excitation electrode is electrically positive with respect to the return electrode. In a preferred embodiment, 1000 volts of direct current is placed across the excitation electrode and the laser block for 16 hours at a temperature of 250° Fahrenheit.

DETAILED DESCRIPTION OF THE PREFERRED EMBODIMENTS

Figure 1:
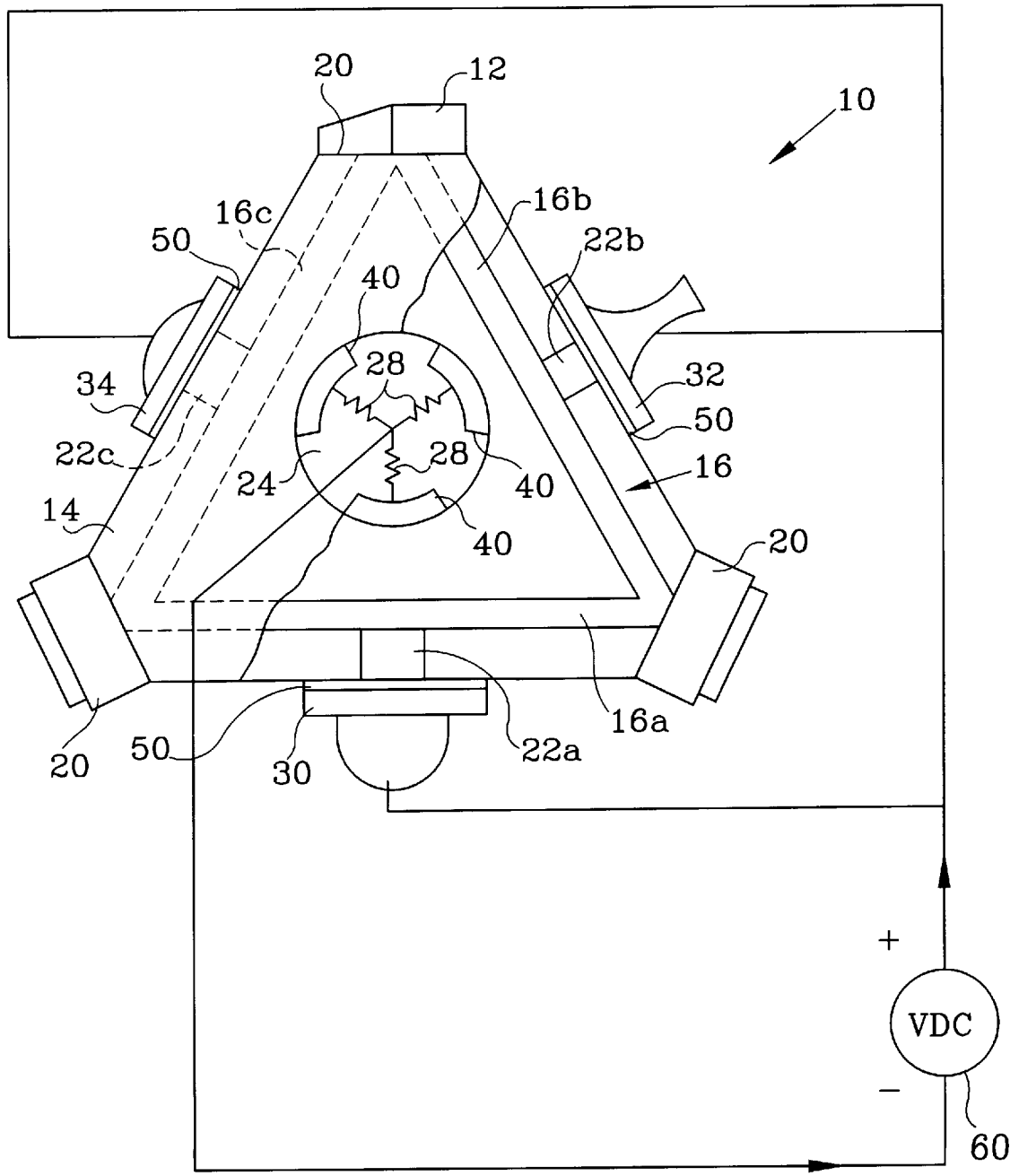
FIG. 1 is a top view of a ring laser gyro in accordance with the present invention shown partially in section to illustrate the optical closed loop pathway formed within the laser block.
Figure 2:
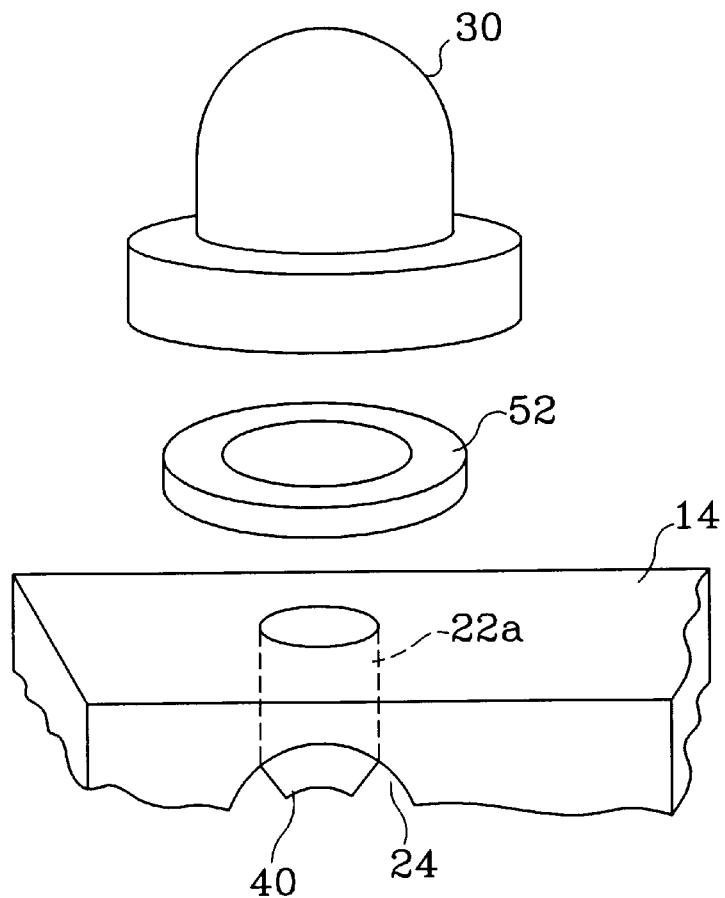
FIG. 2 is an exploded perspective view of a portion of a side of the ring laser gyro of FIG. 1 showing in greater detail one of the electrodes and the sealing material prior to it being compressed.
Figure 3:
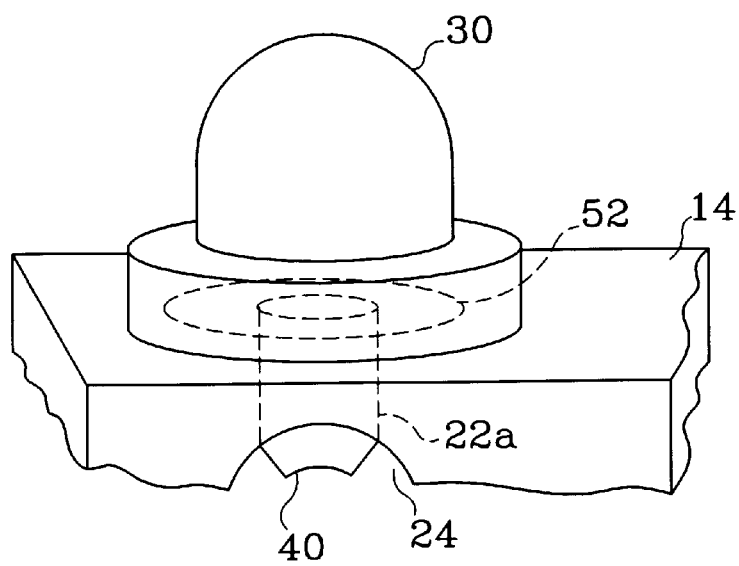
FIG. 3 is a perspective view of the portion of the ring laser gyro of FIG. 2 showing the electrode mounted to the laser block after the compression of the sealing material in preparation for the anodic bonding process.

With reference to FIGS. 1–3, a ring laser angular rate sensor 10, more commonly referred to as a ring laser gyro, in accordance with the present invention is shown. Ring laser gyro 10 includes a laser block 14 having an optical closed loop pathway filled with a lasing gas that is adapted to be electrically charged. The ring laser gyro 10 further includes structure for creating an electrical potential through the lasing gas, which creates a population inversion in the lasing gas and generates a laser within the optical closed loop pathway of the laser block 14. A sensor array 12 attached to the ring laser gyro 10 measures the angular rate experienced by the ring laser gyro 10 as a function of the deflection of the laser.

More particularly, the laser block 14 includes a closed loop path 16 comprising a plurality of interconnected passages 16a, 16b, and 16c (shown partially in phantom). In the embodiment of FIG. 1, laser block 14 is substantially triangularly shaped, with passages 16a, 16b, and 16c formed within block 14 parallel to a side of the triangular block 14. The three individual passages 16a, 16b, and 16c are connected at their ends with the neighboring passages to create a closed loop path 16 in a triangular shape. Reflective surfaces, such as mirrors 20, are positioned and appropriately angled at the intersection of the individual passages 16a, 16b, and 16c to reflect light from one passage into another passage. In this manner, an optical closed loop path is defined within the closed loop passage 16 of the laser block 14. While the overall shape of the laser block 14 and the closed loop path 16 are shown in FIGS. 1–3 and described as being triangular, the closed loop path 16 of ring laser gyro 10 can be in the shape of any polygon. The laser block 14 itself can be any shape desired.

Laser block 14 is formed from a dielectric material, such as glass or glass-ceramic, having a relatively low coefficient of thermal expansion. One particularly well-suited material is a lithium-aluminum-silicate glass ceramic material marketed under the tradename Zerodur®, available from Schott Glass Technologies, Inc. of Duryea, Penn. Zerodur® brand glass ceramic material has a coefficient of thermal expansion that is substantially 0.

The structure for generating the laser that traverses the optical closed loop path includes a fluid, commonly referred to as a "lasing gas," contained within the closed loop path 16 that is capable of being electrically charged, and at least two excitation electrodes 30 and 32 that are mounted to the laser block 14 in fluid communication with the lasing gas. A mixture of helium and neon can be used as the lasing gas within the block 14. To facilitate the insertion of the lasing gas into the laser block 14, one of the electrodes mounted to the laser block, such as excitation electrode 32, can be fitted with a fluid port, as is known. Excitation electrodes 30 and 32 are in fluid communication with the lasing gas contained within the closed loop path 16 through apertures 22a and 22b formed in block 14 between the region where excitation electrodes 30 and 32 are mounted on block 14 and the passages 16a and 16b.

The excitation electrodes 30 and 32 of the ring laser gyro 20 are each adapted to be connected to a source of electrical potential (not shown). Excitation electrodes 30 and 32 can be formed from known conductive materials, such as beryllium or aluminum. One material well suited for excitation electrodes 30 and 32 is invar, a nickel-iron alloy commercially available from a number of sources, such as Atlantic Equipment Engineers of Bergenfield, N.J., and having a coefficient of thermal expansion that is also substantially 0. Excitation electrode 30 is connected to the negative terminal of the source of electrical potential, and thus functions as a cathode. Excitation electrode 32 is connected to the positive terminal of the source of electrical potential, and thus acts as an anode. In this manner, an electrical potential can be placed across the cathode and the anode through the lasing gas. The lasing gas in the laser block 14 thus becomes electrically charged, and, when the electrical potential is sufficiently large to create a population inversion within the lasing gas, a laser is generated. The closed loop path 16 and the mirrors 20 of the ring laser gyro 10 will cause the laser to traverse the optical closed loop pathway of the laser block 14.

As shown in FIG. 1, a third excitation electrode 34 can be included in the ring laser gyro 10. This third excitation electrode 34 is positioned on the third side 16c of the laser block 14, and is in fluid communication with the lasing gas in the closed loop passage 16 through transverse aperture 22c (shown in phantom) formed between passage 16c and excitation electrode 34. Similar to second excitation electrode 32, the third excitation electrode 34 is attached to a positive terminal of the source of electrical potential, and thus functions as a second anode. In the manner described above, a laser can be generated that traverses the optical closed loop pathway in a counter-rotating direction to the laser generated by the cathode 30 and the anode 32.

To ensure the proper operation of ring laser gyro 10, the cathode excitation electrode 30 and the anode excitation electrodes 32 and 34 must be effectively sealed to the laser block 14. An electrode seal 50 is created between the excitation electrode 30 and the laser block 14 to bond the excitation electrode 30 to the laser block 14 in a gas-tight manner. While only one excitation electrode 30 is illustrated in FIGS. 2 and 3, the anodic bonding process described below can be performed simultaneously on all or on a select number of excitation electrodes 30, 32, and 34 (as is schematically illustrated in FIG. 1).

To form the electrode seal 50, a thin ring of ductile metallic sealing material 52 is compressed between the electrode 30 and the laser block 14. Indium is one material that is useful in this regard due to its ductile nature and bonding characteristics, although other suitable sealing materials can of course be used. Unoxidized material from the interior of the sealing material 52 is exposed to oxide containing laser block surfaces and electrode surfaces during this compression operation, which allows chemical and physical bonds to be formed between the sealing material 52 and block 14, and between the sealing material 52 and the excitation electrode 30. A compression force of approximately 4500 pounds per square inch has been found to be sufficient to create the seal 50 between the excitation electrode 30 and the laser block 14.

The seal 50 can be strengthened and made more durable beyond this point through the use of an anodic bonding process. As used herein, the term "anodic bonding" describes a process of using an electrical potential across an interface to electrically enhance or enable the bonding between the substrates. In such a process, the electrical potential facilitates the reaction of the metal surface of one substrate with the available oxygen at the other substrate to produce covalent metal-to-oxygen bonds. The application of the electrical potential causes the formation of a greater number of metal-to-oxygen bonds and physical bonds between the substrates than would otherwise be formed, thus producing a stronger, more durable bond between the substrates.

The anodic bonding process is advantageously used to mount the excitation electrode 30 to the laser block 14, and thus increase the bond strength of the electrode seal 50. In this process, a return electrode 40 is placed within a cutout 24 of laser block 14. Cutout 24 is typically used to mount one or more dither motors (not shown) to ring laser gyro 10, as is known. Return electrode 40 is positioned in contact with the laser block 14 at a position in proximity to the excitation electrode 30. Mechanical springs 28 can be used to provide a steady force to the return electrodes 40 during the anodic bonding process, and thereby hold them against the laser block 14 at the appropriate location.

A voltage from a source of electrical potential 60 (shown in FIG. 1) is applied across the excitation electrode 30 and the laser block 14 such that the polarity of the excitation electrode 30 is positive with respect to the laser block 14. In the embodiment shown, then, excitation electrode 30 is connected to the positive terminal of electrical potential 60, while return electrode 40 is attached to the negative terminal of potential 60. In this manner, a positive electrical potential is applied across the excitation electrode and the laser block. The voltage is maintained across the laser block 14 and excitation electrode 30 for a pre-determined amount of time. Performing the anodic bonding process in an environment having a pre-determined ambient temperature further facilitates the formation of the electrode seal 50.

A positive potential is required between excitation electrode 30 (having the seal to be bonded) and return electrode 40. Such a potential enhances the formation of metal to oxygen bonds and facilitates interdiffusion of metal ions into the oxide containing material and oxygen into the seal material. At least two mechanisms play a role in this facilitation. First, alkali metal ions in the laser block material are attracted to, and migrate toward, the negative return anode. Such migration leaves negatively charged, relatively immobile, oxygen ions in the vacated regions. This oxygen in the proximity of the seal surface is free to react (bond) with the seal metal where contact between the seal metal and oxide containing laser block glass exists. Further, intimate contact between the metal seal and laser block material is enhanced during the application of the electrical potential by a resulting electrostatic force between the positively charged seal metal and negatively charged oxygen ions near the seal surface of the laser block.

A return electrode 40 positioned within the dither motor cutout 24 is illustrated in FIGS. 1–3 as the structure used to apply the electrical potential across the excitation electrode 30 and the laser block 14, and thereby carry out the anodic bonding process. Other approaches can be used, of course, to apply such a potential, and thus carry out the anodic bonding process. For example, a return electrode can be positioned at any practical location on the laser block, the only requirements being proximity to excitation electrode 30 and intimate contact with laser block 14.

The magnitude of the electrical potential, the time period for applying the potential, and the preferred processing temperature can be optimized to develop an electrode bond 50 having the desired strength. When indium is used as sealing material 52, a voltage of 450 Volts (direct current) applied for 72 hours in an environment having an ambient temperature of 250° Fahrenheit has been found to produce observable increases in bond strength and seal behavior. Processing at temperatures as low as 180° Fahrenheit has also been accomplished. The processing temperature must be kept below the melting point of the sealing material 52, however, so as to keep from melting the seal 50. When indium is used for sealing material 52, then, the processing temperature must be kept below 315° Fahrenheit.

A preferred processing environment is 1000 Volts direct current applied for 16 hours at 250° Fahrenheit for a ring laser gyro 10 having 2 inch sides. Such anodic bonding process conditions are desirable because such conditions can be accommodated concurrent with other unrelated gyro manufacturing processes. Thus this anodic bonding process can be added to existing manufacturing processes without negatively impacting manufacturing efficiency.

A ring laser gyro 10 having an electrode seal 50 formed using an anodic bonding process such as is described above possesses many advantages over conventional processes for forming electrode seal 50. An anodic bonding process facilitates the creation of a greater number of physical and chemical bonds between the laser block 14 and the sealing material 52, and between the electrode 30 and the sealing material 52, than are achieved through a conventional process involving only the compression of ductile sealing material 52. This in turn increases the durability and bond strength of electrode seal 50. This is particularly observable over the time and temperature cycling that occurs during the useful life of the ring laser gyro 10.

In addition, seal 50 is more resistant to certain solvents and reactive compounds as compared to a seal that does not undergo an anodic bonding process. For example, during normal operation of the ring laser gyro 10, lithium in the laser block 14 can be attracted to the negatively charged cathode 30. Lithium is a highly reactive metal that can interact with material 52, block 14 and certain solvents thus destroying seal 50 leading to failure of ring laser gyro 10.

Although the present invention has been described with reference to preferred embodiments, those skilled in the art will recognize that changes may be made in form and detail without departing from the spirit and scope of the invention.

The embodiments of the invention in which an exclusive property or right is claimed are defined as follows:

1. The method for forming an electrode seal between an excitation electrode and a laser block of a ring laser angular rate sensor, comprising the steps of:

providing a laser block having an optical closed loop path;

mounting an excitation electrode to the laser block so that the excitation electrode is in fluid communication with the optical closed loop path of the laser block;

applying a predetermined electrical potential across the excitation electrode and the laser block for a predetermined amount of time and at a predetermined ambient temperature to create an electrode bond;

placing a ductile metallic sealing material between the excitation electrode and the laser block; and applying a compressive force to the sealing material to form physical and chemical bonds between the excitation electrode and the sealing material and between the laser block and the sealing material.

2. The method for forming an electrode seal of claim 1, wherein the ductile metallic sealing material is indium.

3. The method for forming an electrode seal of claim 1, wherein the step of applying a predetermined electrical potential across the excitation electrode and the laser block includes:

placing a return electrode in contact to a surface of the laser block in proximity to the excitation electrode;

connecting the return electrode to the negative terminal of a source of electrical potential; and connecting the excitation electrode of the ring laser gyro to the positive terminal of the source of electrical potential to provide an electrical potential across the excitation electrode and the laser block of the ring laser gyro.

4. The method for forming an electrode of claim 3, wherein the step of placing the return electrode in contact to a surface of the laser block in proximity to the excitation electrode includes positioning the return electrode within a dither motor cutout in contact with the surface of the laser block.

5. The method for forming an electrode seal of claim 3, wherein at least about 450 volts of electrical potential is applied across the excitation electrode and the laser block for a predetermined amount of time and at a predetermined ambient temperature.

6. The method for forming an electrode seal of claim 3, wherein the predetermined electrical potential is applied across the excitation electrode and the laser block for a predetermined amount of time at an ambient temperature of at least about 180° Fahrenheit.

7. The method for forming an electrode seal of claim 3, wherein about 1000 volts of electrical potential is applied across the excitation electrode and the laser block for about 16 hours at an ambient temperature of about 250° Fahrenheit.

8. The method for manufacturing a ring laser angular rate sensor, comprising the steps of:

provide a laser block of dielectric material and having an optical closed loop path and at least two apertures extending between the optical closed loop path and the exterior of the laser block;

bonding a first excitation electrode having a metallic exterior surface over one of the apertures in the laser block;

bonding a second excitation electrode having a metallic exterior surface over the other one of the apertures in the laser block;

applying a pre-determined electrical potential across the first excitation electrode and the laser block for a pre-determined period of time at a pre-determined ambient temperature;

placing a ductile metallic sealing material between each of the first and second excitation electrodes and the laser block; and applying a compressive force to the sealing material to form physical and chemical bonds between the excitation electrode and the sealing material and between the laser block and the sealing material, wherein the application of the electrical potential across the excitation electrode increases the number of physical and chemical bonds that are formed.

9. The method for manufacturing a ring laser angular rate sensor of claim 8, further including the step of applying a predetermined electrical potential across the second excitation electrode and the laser block for a pre-determined period of time at a pre-determined temperature.

10. The method for manufacturing a ring laser angular rate sensor of claim 9, wherein the steps of applying a predetermined electrical potential across the first and second excitation electrodes and the laser block includes:

placing a first return electrode in contact with the surface of the laser block close proximity to the first excitation electrode;

placing a second return electrode in contact with the surface of the laser block close proximity to the second excitation electrode;

connecting the first and second return electrodes to the negative terminal of a source of electrical potential; and connecting the first and second excitation electrodes of the ring laser gyro to the positive terminal of the source of electrical potential so as to provide an electrical potential across the excitation electrodes and the laser block of the ring laser gyro.

11. The method for manufacturing a ring laser angular rate sensor of claim 9, wherein at least about 450 volts of electrical potential is applied across the excitation electrodes and the laser block for a predetermined amount of time and at a predetermined ambient temperature.

12. The method for manufacturing a ring laser angular rate sensor of claim 10, wherein the predetermined electrical potential is applied across the excitation electrodes and the laser block for a predetermined amount of time at an ambient temperature of at least about 180° Fahrenheit.

13. The method for manufacturing a ring laser angular rate sensor of claim 10, wherein about 1000 volts of electrical potential is applied across the excitation electrodes and the laser block for about 16 hours at an ambient temperature of about 250° Fahrenheit.

* * * * *